United States Patent [19]

Muller

[11] 4,433,647
[45] Feb. 28, 1984

[54] INTERNAL COMBUSTION MOTOR WITH TURBULENCE CHAMBER

[76] Inventor: Rudolf Muller, Chemin du Ciclet, 1860 Aigle, Switzerland

[21] Appl. No.: 293,623

[22] PCT Filed: Dec. 18, 1980

[86] PCT No.: PCT/CH80/00157
§ 371 Date: Aug. 6, 1981
§ 102(e) Date: Aug. 6, 1981

[87] PCT Pub. No.: WO81/02038
PCT Pub. Date: Jul. 23, 1981

[30] Foreign Application Priority Data

Jan. 3, 1980 [CH] Switzerland ............... 1/80

[51] Int. Cl.³ .............. F02B 19/18; F02B 31/00
[52] U.S. Cl. .............. 123/263; 123/268; 123/279; 123/275; 123/290; 123/286
[58] Field of Search ........... 123/260, 274, 281, 282, 123/283, 284, 286, 289, 290, 291, 262, 263, 268, 257, 261, 269, 275, 279

[56] References Cited

U.S. PATENT DOCUMENTS

| | | | |
|---|---|---|---|
| 1,645,423 | 10/1927 | Haibe | 123/262 |
| 1,729,972 | 10/1929 | Horning | 123/262 |
| 3,230,939 | 1/1966 | Goossak | 123/260 |
| 3,244,158 | 4/1966 | Steidler | 123/268 |
| 4,005,684 | 2/1977 | Habu | 123/260 |
| 4,038,952 | 8/1977 | Nagano | 123/260 |
| 4,183,343 | 1/1980 | Tanahashi et al. | 123/274 |
| 4,232,637 | 11/1980 | Pichard | 123/290 |

FOREIGN PATENT DOCUMENTS 883106 12/1946 France ............... 123/286

*Primary Examiner*—Ira S. Lazarus
*Assistant Examiner*—R. S. Bailey
*Attorney, Agent, or Firm*—Lerner, David, Littenberg, Krumholz & Mentlik

[57] ABSTRACT

In accordance with the teachings of the present invention an internal combustion engine comprising at least a combustion chamber, a piston, a turbulence chamber provided inside the overhead cylinder above the piston, and an ignition device leading to the turbulence chamber is provided. The invention is characterized in that at least one channel provided at the base of the overhead cylinder, opens tangentially along the walls of the turbulence chamber. The channel has, at its origin, a width substantially equal to the diameter of the seat of the intake valve and narrows as it goes deeper in the direction of the turbulence chamber. This engine embodies an improvement of the Otto type engines.

10 Claims, 8 Drawing Figures

INTERNAL COMBUSTION MOTOR WITH TURBULENCE CHAMBER

The present invention concerns an internal combustion engine comprising at least one combustion chamber, a corresponding piston, a spherical or ovoid turbulence chamber hereinafter sometimes referred to as a chamber having a revolution of symmetry about an axis, present in the cylinder head at the upper end of the combustion chamber and a compressed gas ignition means mounted in the wall of the the turbulence chamber. Otto type engines comprising a turbulence chamber provided in the cylinder head above the combustion chamber are known. By way of an example, German patent application No. 2624211 published on Dec. 15, 1977 describes an engine comprising a turbulence chamber appreciably of a revolution ellipsoid form, communicating with the combustion chamber by a tubular pipe. The French patent application published on Oct. 19, 1979 under No. 2420033, now Brevet D'Invention No. 7836899, describes an engine of the same type comprising an opening communicating through an elongated channel with the upper part of the combustion chamber. German patent application No. 2542942 published on Aug. 26, 1976 before examination describes an internal combustion engine comprising a turbulence chamber present in the cylinder head between the combustion chamber and the exhaust valve.

All these devices attempt to promote better homogeneity of the combustible mixture containing a surplus of air. It is known that an increase of the rate of compression and the surplus of air in a combustible mixture produces improved performance of an internal combustion engine and allows a considerable reduction in the percentage of toxic components in the exhaust gas. This is due essentially to improved combustion and results, in a known manner, in a considerable reduction in fuel consumption.

The present invention proposes a perfection of this type of engine which improves the homogeneity of the mixture, allowing the same to function function at a very high rate of compression and further reduces fuel consumption.

The present invention is characterized in that the turbulence chamber may be connected to the combustion chamber by at least one channel provided in the cylinder head opening at a tangent at the base of the turbulence chamber narrowing down, in a manner to provide a better flow of the combustible mixture entering the chamber, and to release an ordinate cyclonic turbulence of this mixture around the symmetry axis of the chamber.

According to an exemplary embodiment, an internal combustion four-stroke engine comprises two tangential channels communicating with the entry of the turbulence chamber, each one of these channels having its origin immediately next to the inlet valve, the exhaust valve and narrowing down to open at a tangent along the wall of the turbulence chamber immediately next to the entrance opening of this chamber. The depth of the channels is appreciably in inverse progression with respect to the width thereof. The channels preferably have a greater depth along their concave edge than along their convex edge. These different dispositions allow an accelerated flow of the mixture and a flow opening at a tangent to the interior of the turbulence chamber. Additionally the flow is slightly inclined in the direction of the bottom of the chamber. These characteristics propagate a helicoidal circulation in the interior of the turbulence chamber.

According to a particular embodiment of the present invention, the ignition means is mounted on one of the walls of the turbulence chamber and fuel injection means is mounted at the closed end of the turbulence chamber substantially along an extension of the longitudinal axis of the chamber. This particular disposition causes a stratification of the mixture to be obtained, i.e. a concentration of the part which is the richest in fuel at the top of the turbulence chamber. The configuration permits the compression rate of the engine to increase considerably and consequently greatly increased performance is attained.

The present invention will be better understood with reference to the description of several exemplary embodiments thereof in conjunction with the attached drawing in which.

Figure 1:
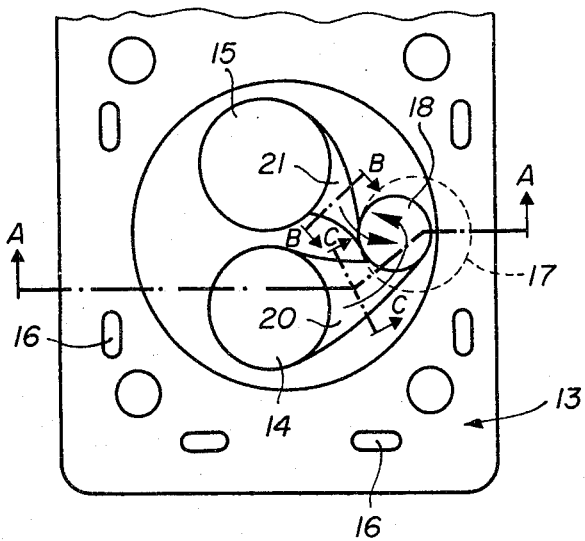
FIG. 1 represents a partial view of the bottom of a cylinder head of a four-stroke internal combustion engine according to the invention.
Figure 2:
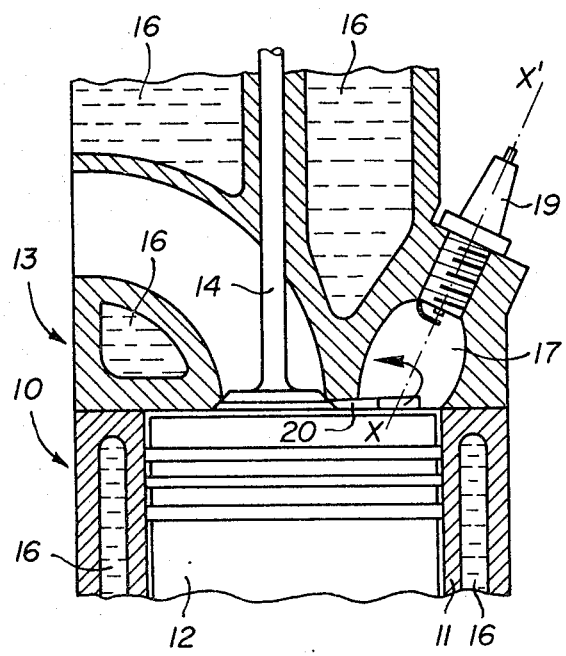
FIG. 2 represents a cross section view according to line A—A of FIG. 1.

With reference to FIGS. 1 to 3, the four-stroke engine block 10, represented partially in cross section, comprises four combustion chambers 11 in which are mounted respectively four pistons 12. A cylinder head 13 surmounts the engine block 10 and carries four inlet valves 14, four exhaust valves 15, as well as the driving gear for these valves (not shown). In a manner well known to those of ordinary skill in the art, cooling channels 16 are provided in the block 10 and the cylinder head 13 to ensure proper cooling of the engine during operation. A turbulence chamber 17 of an ovoid shape is provided in the cylinder head and is opened to the upper end of the combustion chamber by a substantially circular opening 18. A spark plug 19 is mounted at the upper end of the turbulence chamber 17 along the axis XX' of the latter.

Figure 3A:
FIGS. 3A and 3B represent a cross section view respectively according to lines B—B and C—C of FIG. 1.
Figure 3B:

Two channels 20 and 21 are provided at the base of the cylinder head 13, respectively between the inlet valve seat 14 and that of the exhaust valve 15. These two channels open up appreciably at a tangent to the opening 18 of the turbulence chamber 17. These two channels are of a width which decreases from the origin (next to the valves) to the termination (near the opening 18). Thus a kind of nozzle is obtained to cause an acceleration of the gas flow entering the turbulence chamber. The depth of these channels varies substantially inversely to the width, to better guide and canalize the gas flow in order to impart an accelerated helicoidal movement inside the turbulence chamber. Lastly, as best shown in FIGS. 3A and 3B, the channels have a depth which is greater on the concave side of the channel when compared to the depth on the convex side. This also enables the gas flow to be better guided and to obtain, at the entrance of the turbulence chamber 17, a greatly accelerated flow which is approximately tangent to the walls of the chamber.

In a four-stroke motor it has been noticed that it is advantageous but not absolutely necessary to equip each cylinder with channels 20 and 21. It could be considered making a motor comprising only channel 20 for each motor cylinder.

In the example described in connection with FIG. 1, the spark plug is placed along an axis XX' of the turbulence chamber, at the upper end of the latter, allowing progressive ignition of the mass of compressed gases and preventing a spreading of heat towards the mass of combustible mixture before the latter is compressed to the maximum. Thus, auto-ignition is delayed considerably or provided allowing improved performance of the engine.

In the example illustrated in connection with FIG. 4, the spark plug 19 is placed in a bore hole 22, which is located along a lateral wall of the turbulence chamber 17. This enables the ignition point to be set back from the wall of the turbulence chamber. It has been noticed that this precaution is particularly useful due to the strong cyclonic turbulence inside the turbulence chamber, which is sufficient to blow out the spark appearing between the electrodes of the spark plug.

According to certain theories, the resulting cyclonic turbulence within the turbulence chamber promotes a projection by centrifugalizing particles of fuel in the direction of the walls of the turbulence chamber. This results in the presence of an enriched mixture in the zone of the chamber near the walls enabling placement of the spark plug laterally with respect to the turbulence chamber.

Furthermore, a cavity 23 may be provided at the upper end of the piston 12, to complete the ovoid form of the turbulence chamber 17, cut at its base.

Figure 4:
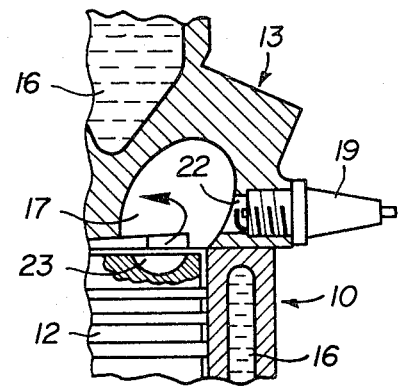
FIG. 4 represents a partial cross section view of another embodiment of a four-stroke engine according to the invention.
Figure 5:
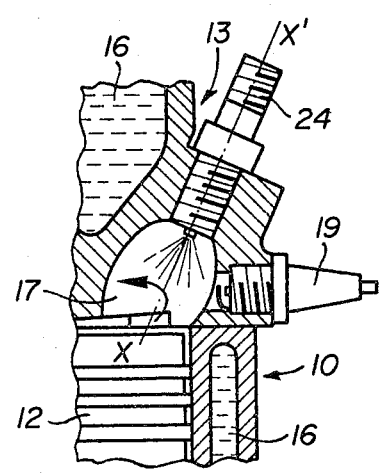
FIG. 5 represents a partial cross section view of a variant of a four-stroke engine according to the invention, comprising fuel injection means.

The embodiment of FIG. 5 differs from that of FIG. 4 in that it comprises a direct fuel injection means 24 mounted at the upper end of the turbulence chamber 17 along the axis XX'. Due to this arrangement, a stratification of the mixture occurs so that the concentration of the richest part is in the upper zone of the turbulence chamber 17. This allows progressive ignition of the combustible mixture from the richest zone in the direction of the poorest zone, ensuring excellent propagation of the combustion flame and allowing considerable recession in the usual limits of auto-ignition.

Figure 6:
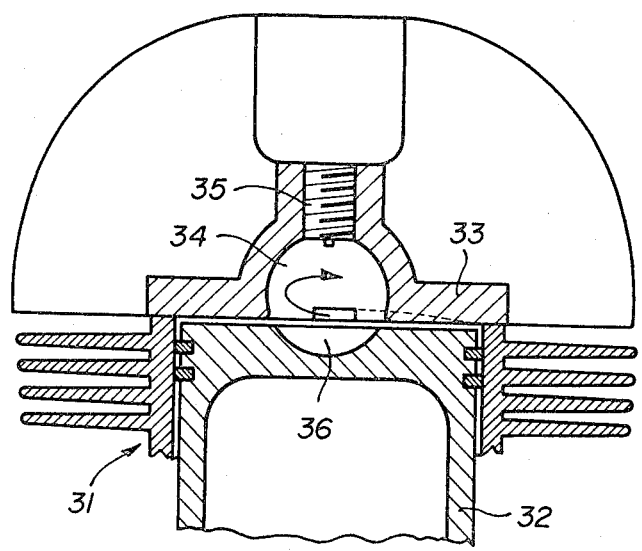
FIG. 6 represents a partial longitudinal cross section view of a two-stroke engine according to the invention and FIG. 7 represents a bottom view of the cylinder head of the two-stroke engine of FIG. 6.
Figure 7:
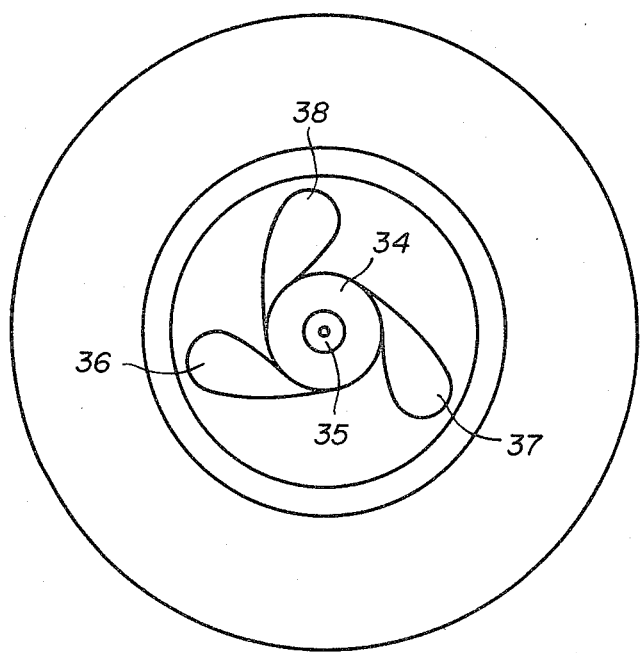

With reference to FIGS. 6 and 7, the two stroke engine partially represented comprises a cylinder 31 containing a piston 32, a cylinder head 33 equipped with a turbulence chamber 34 which is for example spherically shaped, and an ignition means 35 opening at the top of the turbulence chamber 34. In this embodiment, the piston 32 includes a centrally disposed opening 36 sized so that the turbulence chamber 34 and the opening 36 complement each other to form a hollow sphere when piston 32 is in its highest position. In this embodiment three channels 36, 37 and 38 placed symmetrically around the turbulence chamber 34 are provided at the base of the cylinder head to allow better tangential flow of the gases inside the turbulence chamber. As before, the channels have a depth which increases as the width decreases as each channel nears the opening of the turbulence chamber 34. Similarly the depth of the channels is greater on the concave side of each channel than it is on the convex side. The motor of the present invention solves the problem of the rattling in Otto type engines when high compression rates are present. The combustion is accomplished in two phases. The first phase occurs as in Otto motors, at a speed of 20 to 30 m/s. This first phase is limited to the turbulence chamber owing to the penetration of the mixture, until there is over-pressure in the chamber. During the corresponding interval of time, the main mass of the mixture continues to be compressed, without the heat radiated by the beginning of the combustion in the turbulence chamber attaining this mass of compressed mixture. When the piston approaches its high dead point, the section of the entrance channels to the turbulence chamber grow narrow. At this moment the combustion which spreads through the turbulence chamber develops very rapidly a growing high pressure which flows essentially through the contracted channels connecting the turbulence chamber with the combustion chamber. The speed of the gases then reaches approximately 100 m/s. Thus a mass of ignited gas is ejected at high speed out of the turbulence chamber, to spread among the mass strongly compressed above the piston.

Through the forced penetration of the face of ignited gas, a strong turbulence is formed in the remaining non-ignited mixture, which prevents an exploding combustion of this mixture. The face of ignited gas, in a very short time, reaches extremely high speeds. As soon as the piston is driven downwards, the opening of the turbulence chamber increases so that the gases are evacuated and expanded normally without loss of charge.

The engine according to the invention comes at a time when many present day problems concerning the energy crisis and regulations regarding the rate of toxic components in exhaust gases of motor vehicles are present.

I claim:

1. An internal combustion engine comprising at least one combustion chamber, a corresponding piston, a cylinder head, a turbulence chamber having a revolution of symmetry about a symmetry axis provided in said cylinder head at an upper end of said combustion chamber and ignition means for compressed gases mounted in a wall of said turbulence chamber, said turbulence chamber being connected to said combustion chamber by at least one tangential channel provided in said cylinder head, said at least one tangential channel originating at a position remote from said turbulence chamber and opening at a tangent at a base portion of said turbulence chamber, said at least one tangential channel having a concave edge and a convex edge arranged so that the width of said at least one channel narrows down continuously in a direction toward said turbulence chamber, and said at least one channel having a depth which varies appreciably as an inverse progression with respect to the width of said at least one channel with the depth along said concave edge being greater than along said convex edge to thereby provide a better flow of combustible mixture penetrating in said turbulence chamber and enable an ordinate cyclonic turbulence of said combustible mixture around said symmetry axis of said turbulence chamber.

2. The internal combustion engine according to claim 1 wherein said engine takes the form of a two-stroke engine, said turbulence chamber being disposed along an axis common to said axis of symmetry of said combustion chamber and said ignition means and having three channels communicating between said combustion chamber and said turbulence chamber, each channel being located symmetrically and at a tangent about a central opening of the turbulence chamber.

3. The internal combustion engine according to claim 1 wherein said engine takes the form of a four-stroke internal combustion engine having an intake valve and an exhaust valve for said combustion chamber, and wherein said turbulence chamber is connected to said combustion chamber by two of said tangential channels which each communicate with the entrance of said turbulence chamber, one of said tangential channels originating immediately next to said intake valve and the other of said tangential channels originating immediately next to said exhaust valve, and the width of each channel adjacent to its respective valve being appreciably equal to the diameter of said respective valve and narrowing down continuously in the direction of said turbulence chamber.

4. The internal combustion engine according to claim 3 wherein each of said tangential channels has a concave edge and a convex edge and manifests a depth which is greater along said concave edge than along said convex edge.

5. The internal combustion engine according to claim 4 additionally comprising fuel injection means mounted at a closed end of the turbulence chamber substantially along an extension of said axis of said turbulence chamber.

6. The internal combustion engine according to claim 3 wherein said ignition means is disposed along a lateral wall of said turbulence chamber.

7. The internal combustion engine according to claim 3 wherein said ignition means is disposed at a closed end of said turbulence chamber located substantially along an extension of said symmetry axis of said turbulence chamber.

8. The internal combustion engine according to claim 3 wherein said combustion chamber has an axis of symmetry, and wherein said turbulence chamber is displaced from said axis of symmetry of said combustion chamber.

9. An internal combustion engine comprising at least one combustion chamber, a corresponding piston, a cylinder head, an intake valve and an exhaust valve in said cylinder head, a turbulence chamber having a revolution of symmetry about a symmetry axis provided in said cylinder head at an upper end of said combustion chamber and ignition means for compressed gases mounted in a wall of said turbulence chamber, said turbulence chamber being connected to said combustion chamber by first and second tangential channels, said first tangential channel originating immediately next to said intake valve and said second tangential channel originating immediately next to said exhaust valve, and each of said first and second channels opening at a tangent at a base portion of said turbulence chamber, the width of each of said first and second tangential channels adjacent to its respective valve being appreciably equal to the diameter of said respective valve and narrowing down continuously in a direction towards said turbulence chamber, and each of said first and second channels having a depth which varies appreciably as an inverse progression with respect to its width to thereby provide a better flow of combustible mixture penetrating in said turbulence chamber and enable an ordinate cyclonic turbulence of said combustible mixture around said symmetry axis of said turbulence chamber.

10. The internal combustion engine according to claim 9 wherein each of said first and second tangential channels has a concave edge and a convex edge, and manifests a depth which is greater along said concave edge than along said convex edge.

* * * * *

UNITED STATES PATENT AND TRADEMARK OFFICE
CERTIFICATE OF CORRECTION

PATENT NO. : 4,433,647
DATED : February 28, 1984
INVENTOR(S) : Rudolf Muller

It is certified that error appears in the above-identified patent and that said Letters Patent are hereby corrected as shown below:

Column 1, line 8, after "chamber", insert --,--.

Column 1, line 26, delete "before examination".

Column 1, line 45, "is" should read --may be--.

Column 3, line 19, "provided" should read --avoided--.

Signed and Sealed this

Tenth Day of July 1984

|SEAL|

*Attest:*

*Attesting Officer*

GERALD J. MOSSINGHOFF

*Commissioner of Patents and Trademarks*